(12) United States Patent
Moreno

(10) Patent No.: US 11,415,094 B2
(45) Date of Patent: Aug. 16, 2022

(54) FUEL PRESSURE REGULATOR

(71) Applicant: DELPHI TECHNOLOGIES IP LIMITED, St. Michael (BB)

(72) Inventor: Alejandro Moreno, El Paso, TX (US)

(73) Assignee: DELPHI TECHNOLOGIES IP LIMITED, St. Michael (BB)

( * ) Notice: Subject to any disclaimer, the term of this patent is extended or adjusted under 35 U.S.C. 154(b) by 127 days.

(21) Appl. No.: 16/398,736

(22) Filed: Apr. 30, 2019

(65) Prior Publication Data

US 2020/0347811 A1 Nov. 5, 2020

(51) Int. Cl.
*F02M 55/04* (2006.01)
*F02M 63/00* (2006.01)
*F16K 17/04* (2006.01)
*F02M 63/02* (2006.01)
*F02M 69/54* (2006.01)

(52) U.S. Cl.
CPC ........ *F02M 55/04* (2013.01); *F02M 63/0035* (2013.01); *F02M 63/0052* (2013.01); *F02M 63/0075* (2013.01); *F02M 63/0235* (2013.01); *F02M 69/54* (2013.01); *F16K 17/0433* (2013.01)

(58) Field of Classification Search
CPC .............. F02M 55/04; F02M 63/0035; F02M 63/0052; F02M 63/0235; F02M 69/54; F02M 63/0075; F02M 2200/9015; F02M 63/0077; F02M 63/005; F02M 21/023; F16K 17/0433; F16K 1/00; F16K 15/14
See application file for complete search history.

(56) References Cited

U.S. PATENT DOCUMENTS

| | | | | | |
|---|---|---|---|---|---|
| 1,985,140 | A | * | 12/1934 | Blom | F04B 39/1033 137/454.4 |
| 2,218,871 | A | * | 10/1940 | Broden | F16K 1/00 251/333 |
| 2,301,599 | A | * | 11/1942 | Whitten | B60T 11/224 60/578 |
| 2,408,634 | A | * | 10/1946 | Hagen | B65D 49/04 215/25 |
| 2,451,336 | A | * | 10/1948 | Hagen | B65D 49/04 215/25 |

(Continued)

FOREIGN PATENT DOCUMENTS

| | | | | |
|---|---|---|---|---|
| DE | 2351205 A1 | * | 4/1975 | ............. F02M 69/22 |
| GB | 2004032 A | * | 3/1979 | ............. F02M 69/54 |
| JP | 2009052470 A | | 3/2009 | |

*Primary Examiner* — Phutthiwat Wongwian
*Assistant Examiner* — Susan E Scharpf
(74) *Attorney, Agent, or Firm* — Joshua M. Haines

(57) ABSTRACT

A fuel pressure regulator includes a fuel inlet; a fuel outlet; a seating surface; and a valve member assembly. The valve member assembly includes a poppet and also includes a sealing member which is made of an elastomer material and which is annular in shape and including a sealing member surface. The sealing member is supported by the poppet. The valve member assembly is moveable between 1) a closed position in which the sealing member surface engages the seating surface, thereby preventing fuel flow from the fuel inlet to the fuel outlet and 2) an open position in which the sealing member surface is spaced apart from the seating surface, thereby allowing fuel flow from the fuel inlet to the fuel outlet.

18 Claims, 7 Drawing Sheets

(56) References Cited

U.S. PATENT DOCUMENTS

| | | | | |
|---|---|---|---|---|
| 2,893,381 | A | * | 7/1959 | Black ................ A61M 16/0012 137/102 |
| 3,561,472 | A | * | 2/1971 | Lamb ..................... F16K 15/14 137/513.3 |
| 3,825,225 | A | * | 7/1974 | Demi ..................... F16K 27/02 251/363 |
| 3,970,106 | A | * | 7/1976 | Harris .................... F16K 15/14 137/843 |
| 4,129,144 | A | * | 12/1978 | Andersson ............ F16K 15/026 137/516.29 |
| 4,203,466 | A | * | 5/1980 | Hager .................... F16J 15/062 137/543 |
| 4,235,211 | A | * | 11/1980 | Sugaya .................. F02M 69/20 123/511 |
| 4,415,003 | A | * | 11/1983 | Paradis .................. F16K 15/14 137/843 |
| 4,589,577 | A | * | 5/1986 | Welsh .................... B67D 3/042 222/518 |
| 4,998,557 | A | * | 3/1991 | Koechlein .......... G05D 16/0666 137/505.42 |
| 5,265,644 | A | | 11/1993 | Tuckey |
| 5,465,938 | A | * | 11/1995 | Werge .................... F16K 15/14 251/149.1 |
| 7,178,553 | B2 | | 2/2007 | Peric et al. |
| 7,363,917 | B2 | | 4/2008 | Kramer et al. |
| 7,444,990 | B1 | * | 11/2008 | Fisher ................... F02D 33/006 123/459 |
| 7,717,092 | B2 | | 5/2010 | Wieczorek |
| 7,726,335 | B2 | | 6/2010 | Doble |
| 8,091,583 | B2 | | 1/2012 | Olshanetsky et al. |
| 9,182,046 | B2 | | 11/2015 | Rull et al. |
| 10,012,178 | B2 | * | 7/2018 | Schmieder ......... F02M 21/0269 |
| 11,280,304 | B1 | * | 3/2022 | Moreno ................ F02M 63/023 |
| 2002/0074043 | A1 | | 6/2002 | Beyer et al. |
| 2004/0000342 | A1 | * | 1/2004 | Takahashi ............ F16K 15/026 137/538 |
| 2004/0069349 | A1 | * | 4/2004 | Wynn .................... G05D 16/02 137/505.25 |
| 2007/0284002 | A1 | * | 12/2007 | Hartman ................ F16K 3/265 137/219 |
| 2009/0056817 | A1 | * | 3/2009 | Almaraz ............... G05D 16/04 137/505 |
| 2009/0277421 | A1 | | 11/2009 | Eisenmenger |
| 2013/0056098 | A1 | * | 3/2013 | Hanjagi ................ F16K 15/026 137/535 |
| 2015/0377185 | A1 | * | 12/2015 | Schmieder ......... F02M 21/0269 123/294 |
| 2016/0215741 | A1 | * | 7/2016 | Porras ................ F02M 63/0052 |

\* cited by examiner

FUEL PRESSURE REGULATOR

TECHNICAL FIELD OF INVENTION

The present invention relates to a fuel pressure regulator, and more particularly to a fuel pressure regulator which includes a seating surface and a sealing member which is made of an elastomer material and which is annular in shape such that the sealing member selectively engages the seating surface.

BACKGROUND OF INVENTION

Fuel systems for supplying liquid fuel, by way of non-limiting example only, gasoline or diesel fuel, to an internal combustion engine typically include a fuel tank for storing a volume of fuel, a fuel pump for pumping fuel from the fuel tank to a fuel rail mounted to the internal combustion engine. The fuel rail includes a plurality of fuel injectors such that each fuel injector is arranged to inject fuel, either directly or indirectly, to a respective combustion chamber of the internal combustion engine. The fuel rail provides a common volume of fuel from which each of the plurality of fuel injectors receives fuel. The fuel pump is typically designed to provide fuel at a constant flow and pressure that meets or exceeds the requirements of the internal combustion engine at maximum output of the internal combustion engine. However, the internal combustion engine is primarily operated below its maximum output capability, and consequently, typically does not require all of the fuel supplied by the fuel pump. Consequently, the fuel system typically includes a fuel pressure regulator which maintains a constant pressure within the fuel rail, or supplied to a high-pressure pump in the case of a direct injection system, by recirculating a portion of the fuel pump output back to the fuel tank. The fuel pressure regulator may be located within the fuel tank or remote from the fuel tank.

One type of fuel pressure regulator is shown in U.S. Pat. No. 5,265,644 to Tuckey. The fuel pressure regulator of Tuckey includes a valve member which is spherical and which selectively seats on a frustoconical seat to prevent flow through the fuel pressure regulator. A known issue with such fuel pressure regulators is that movement of the valve member between open and closed positions is susceptible to hysteresis due to the possibility of misalignment occurring between the valve member and the seat. Furthermore, if the valve member is made of an elastomer material, the valve member may become stuck on the seat because the valve member can elastically deform and wedge into the seat. Also furthermore, if the spherical valve member is made of metal, the seat may require post processing such as coining, burnishing, and/or lapping to ensure proper sealing is provided when the valve member is seated on the seat. For these reasons, current fuel pressure regulators may require added cost and complexity to ensure desired operation.

What is needed is a fuel pressure regulator which minimizes or eliminates one or more the shortcomings as set forth above.

SUMMARY OF THE INVENTION

Briefly described, a fuel pressure regulator includes a fuel inlet; a fuel outlet; a seating surface; and a valve member assembly. The valve member assembly includes a poppet and also includes a sealing member which is made of an elastomer material and which is annular in shape and including a sealing member surface. The sealing member is supported by the poppet. The valve member assembly is moveable between 1) a closed position in which the sealing member surface engages the seating surface, thereby preventing fuel flow from the fuel inlet to the fuel outlet and 2) an open position in which the sealing member surface is spaced apart from the seating surface, thereby allowing fuel flow from the fuel inlet to the fuel outlet. The fuel pressure regulator as disclosed herein allows for a positive seal in the closed position without the need for post processing of the seating surface such as coining, burnishing, and/or lapping of the seating surface because the sealing member is able to conform to the seating surface. By eliminating the need for post processing, manufacturing time and expenses can be minimized. Furthermore, the possibility of hysteresis is minimized since some axial misalignment between the seating surface and the sealing member does not affect sealing. Also furthermore, the sealing member is not susceptible to being stuck to the seating surface which provides ensured opening of the valve member assembly when desired.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

This invention will be further described with reference to the accompanying drawings in which.

DETAILED DESCRIPTION OF INVENTION

Figure 1:
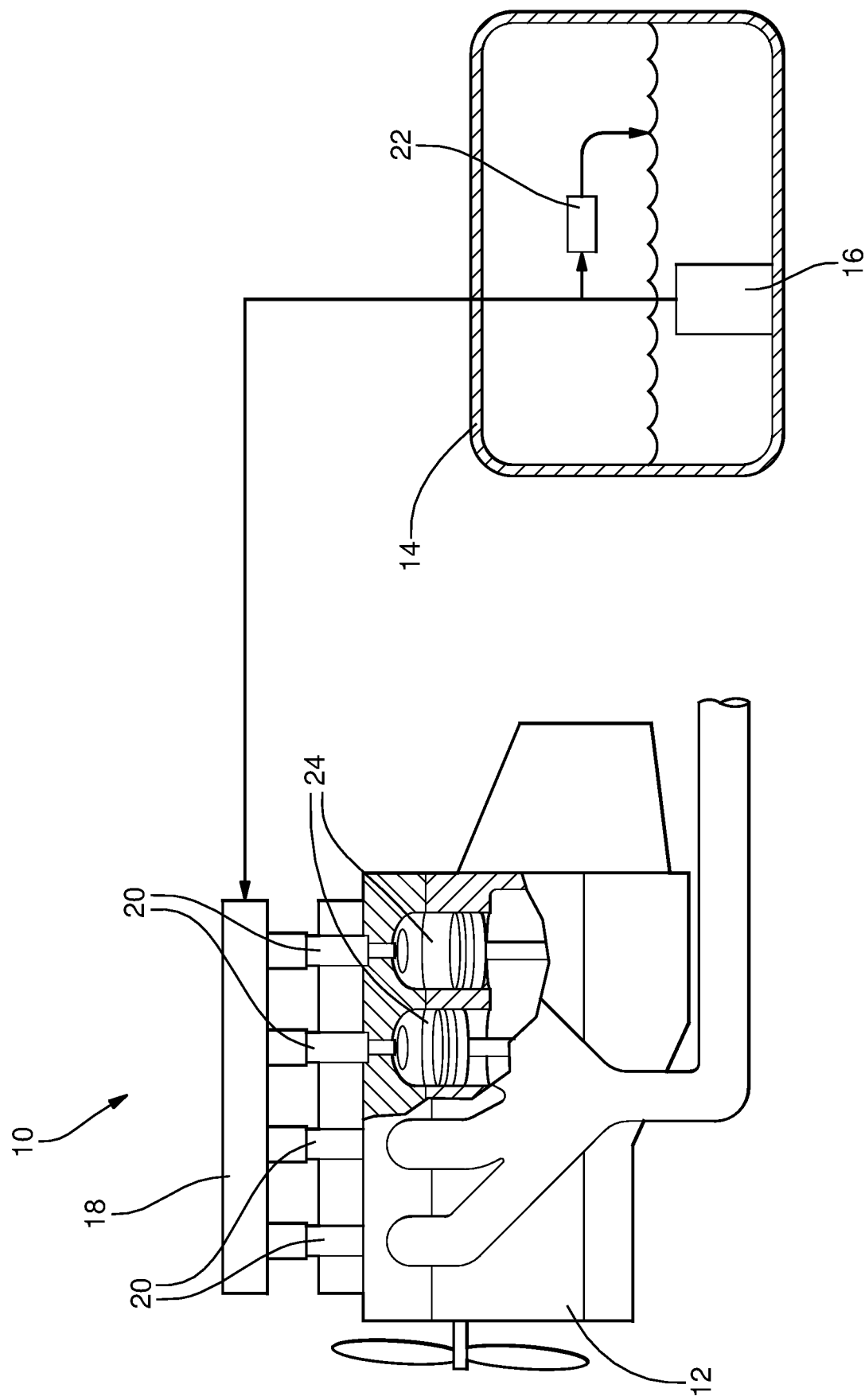
FIG. 1 is a schematic view of a fuel system which includes a fuel pressure regulator in accordance with the present disclosure.
Figure 2A:
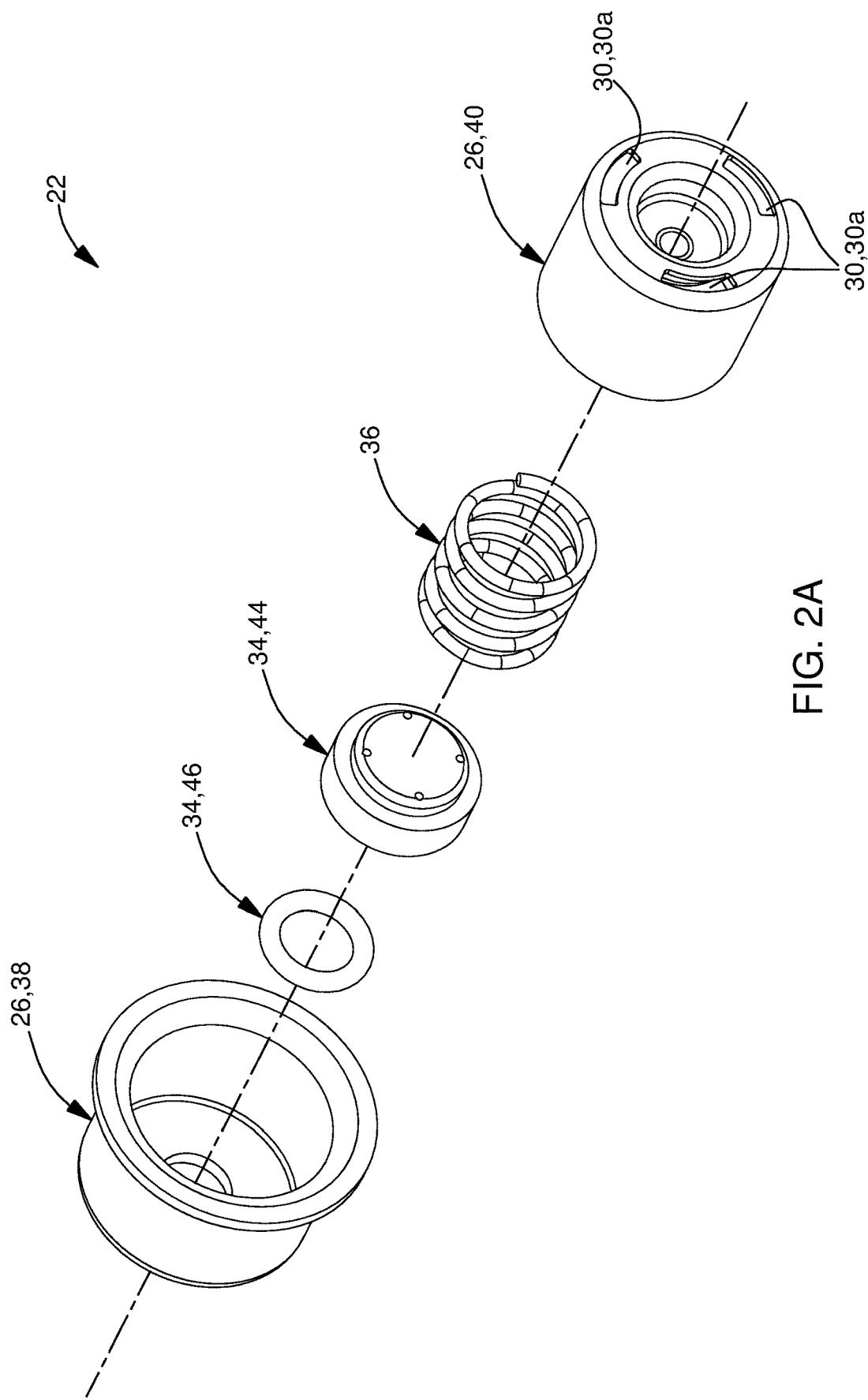
FIGS. 2A and 2B are exploded isometric views of the fuel pressure regulator in accordance with the present disclosure taken from two different perspectives.
Figure 2B:
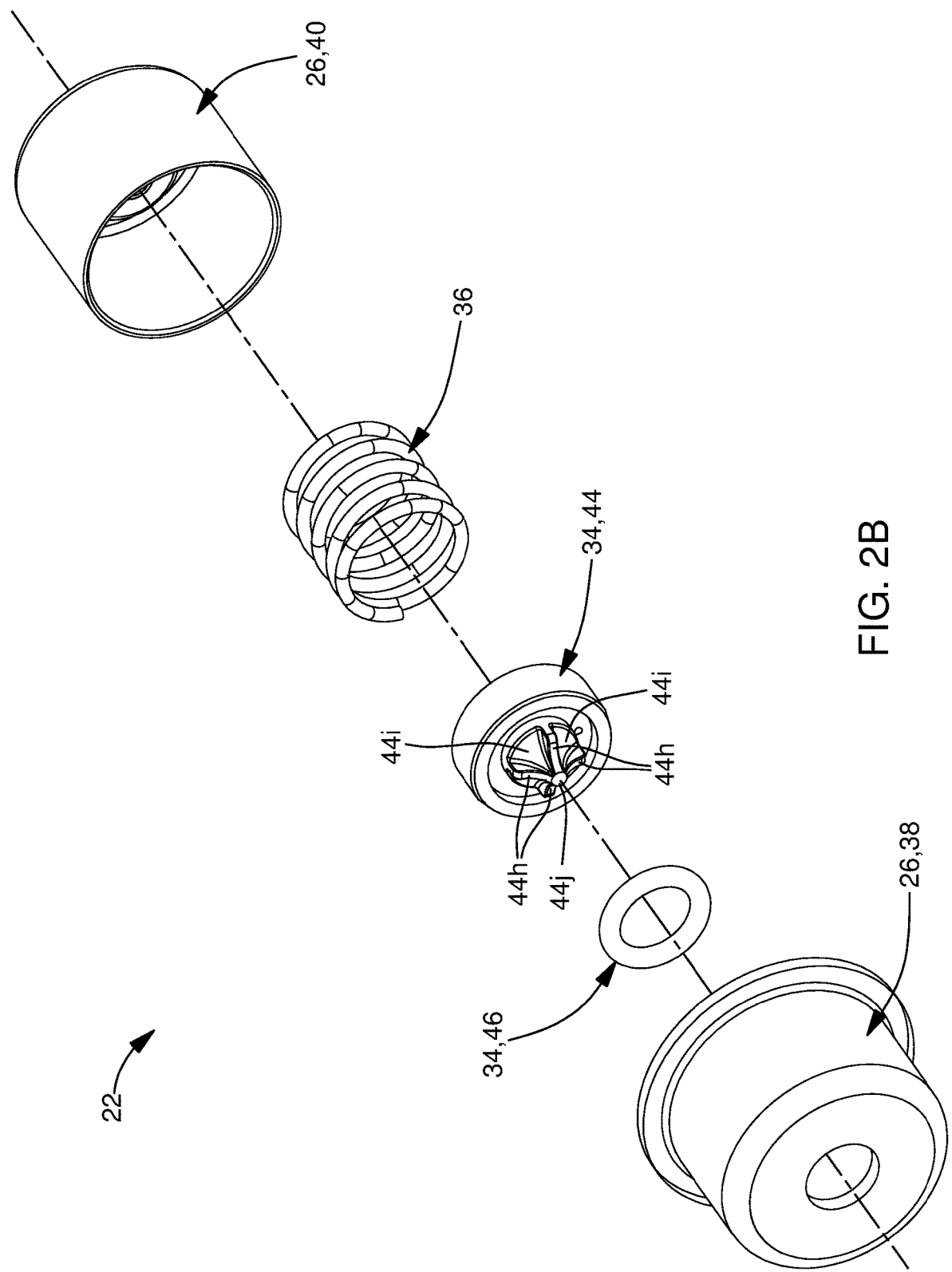

Referring initially to FIG. 1, a fuel system 10 is shown in simplified schematic form for supplying fuel to an internal combustion engine 12, by way of non-limiting example only, for a motor vehicle. Fuel system 10 includes a fuel tank 14 for storing a volume of fuel, a fuel pump 16 which may be located within fuel tank 14 as shown, a fuel rail 18 attached to internal combustion engine 12 and in fluid communication with fuel pump 16, a plurality of fuel injectors 20 in fluid communication with fuel rail 18, and a fuel pressure regulator 22 which regulates the fuel pressure within fuel rail 18. In operation, fuel pump 16 draws fuel from fuel tank 14 and pumps the fuel to fuel rail 18 under pressure. Each fuel injector 20 receives fuel from fuel rail 18 and injects the fuel to a respective combustion chamber 24 of internal combustion engine 12 for combustion of the fuel within combustion chambers 24. Fuel pressure regulator 22 maintains a substantially uniform pressure within fuel rail 18, or to a high-pressure fuel pump in the case of a direct injection system, by recirculating fuel to fuel tank 14 when the pressure within fuel rail 18 is elevated above a predetermined fuel pressure. While fuel pump 16 and fuel pressure regulator 22 have both been illustrated as being located within fuel tank 14, one or both of fuel pump 16 and fuel pressure regulator 22 may alternatively be located outside of fuel tank 14. Furthermore, fuel system 10 may additionally include a high-pressure fuel pump, not illustrated herein, which would be recognized by a practitioner of ordinary skill in the art as being fluidly located between fuel pump 16 and fuel rail 18 in order to further elevate the pressure of the fuel for injection of fuel directly into combustion chambers 24. It should be understood that fuel injectors 20 may inject fuel directly into combustion chambers 24 or may instead inject fuel into the air induction system of internal combustion engine 12 where the fuel is mixed with air before being drawn into combustion chambers 24 through intake combustion valves as in the case of systems commonly referred to as port injection systems.

In accordance with a preferred embodiment of this invention and now referring to FIGS. 2A-5, fuel pressure regulator 22 will be described in greater detail. Fuel pressure regulator 22 generally includes a housing 26 defining a fuel inlet 28 which selectively allows fuel into housing 26 and a fuel outlet 30 which selectively allows fuel out of housing 26; a seating surface 32 located between fuel inlet 28 and fuel outlet 30; a valve member assembly 34 moveable between a closed position (shown in FIGS. 3 and 4) and an open position (shown in FIG. 5) with seating surface 32; and a valve spring 36 which biases valve member assembly 34 toward the closed position where valve spring 36 is a coil compression spring as shown. Fuel inlet 28 is in fluid communication with the outlet of fuel pump 16 while fuel outlet 30 is in fluid communication with the interior of fuel tank 14. The various elements of fuel pressure regulator 22 will be described in the paragraphs that follow.

As illustrated herein, housing 26 comprises a housing first portion 38 and a housing second portion 40. Housing first portion 38 includes a housing first portion circumferential wall 38a which is tubular and which extends from a housing first portion first end 38b to a housing first portion second end 38c along an axis 42. Housing first portion circumferential wall 38a is preferably cylindrical and centered about axis 42. Housing first portion 38 also includes a housing first portion end wall 38d which traverses housing first portion first end 38b such that seating surface 32 is on housing first portion end wall 38d. As illustrated herein, housing first portion end wall 38d is planar, and as a result, seating surface 32 is also planar. Fuel inlet 28 extends through housing first portion end wall 38d such that fuel inlet 28 is defined by housing first portion end wall 38d and such that fuel inlet 28 is preferably centered about axis 42.

Housing second portion 40 includes a housing second portion circumferential wall 40a which is tubular and which extends from a housing second portion first end 40b to a housing second portion second end 40c along axis 42. Housing second portion circumferential wall 40a is preferably cylindrical and centered about axis 42. Housing second portion 40 also includes a housing second portion end wall 40d which traverses housing second portion first end 40b. Housing second portion end wall 40d includes a housing second portion end wall projection 40e which projects toward housing first portion end wall 38d. Valve spring 36 is grounded to housing second portion end wall 40d such that housing second portion end wall projection 40e laterally positions one end of valve spring 36. Fuel outlet 30, illustrated herein as a plurality of apertures 30a, extends through housing second portion end wall 40d, thereby providing a path for fuel to flow out of housing 26.

As illustrated herein, housing second portion 40 is received within housing first portion 38 such that housing second portion circumferential wall 40a is circumferentially surrounded by housing first portion circumferential wall 38a, however, this relationship may alternatively be reversed. Housing first portion 38 and housing second portion 40 are fixed together to prevent relative movement therebetween in operation. Fixing together of housing first portion 38 and housing second portion 40 may be accomplished by interference fit between the inner periphery of housing first portion circumferential wall 38a and the outer periphery of housing second portion circumferential wall 40a, welding, mechanical fasteners, adhesive, combinations of one or more of the foregoing, and the like. By having housing second portion 40 received within housing first portion 38, housing second portion 40 can be inserted within housing first portion 38 sufficiently far during manufacturing to provide a predetermined spring force of valve spring 36 on valve member assembly 34. Consequently, the extent to which housing second portion 40 is received within housing first portion 38 can be unique to each fuel pressure regulator 22 that is manufactured in order to provide a uniform spring force on valve spring 36, within an acceptable tolerance range, in order to accommodate manufacturing variations in the various components of fuel pressure regulator 22. In this way, each fuel pressure regular is able to regulate the fuel pressure of fuel system 10 to an acceptable tolerance range.

In an alternative arrangement not illustrated in the figures, housing second portion 40 may take the form of a disk which is received entirely within housing first portion 38. In this arrangement, fuel outlet 30 may be a single, centrally located aperture passing through the disk. Just as in the illustrated arrangement, the disk can be inserted within housing first portion 38 sufficiently far during manufacturing to provide a predetermined spring force of valve spring 36 on valve member assembly 34.

Valve member assembly 34 includes a poppet 44 and a sealing member 46 which is supported by poppet 44. Poppet 44 includes a central portion 44a which extends along, and is centered about, axis 42 such that central portion 44a extends along axis 42 from a first surface 44b which is traverse to axis 42 to a second surface 44c which is traverse to axis 42. First surface 44b faces toward housing first portion end wall 38d, and consequently, first surface 44b extends radially outward from axis 42 to a greater extent than fuel inlet 28. A sealing member groove 44d extends into central portion 44a from first surface 44b such that sealing member groove 44d is annular in shape and such that a portion of sealing member 46 is received within sealing member groove 44d. While a portion of sealing member 46 is received within sealing member groove 44d, it is important to note that a portion of sealing member 46 extends outward from sealing member groove 44d in a direction parallel to axis 42, thereby allowing sealing member 46 to engage seating surface 32 when valve member assembly 34 is in the closed position. Sealing member groove 44d extends into central portion 44a and terminates at a sealing member groove bottom surface 44e with which sealing member 46 abuts. In order to prevent a buildup of air between sealing member 46 and sealing member groove bottom surface 44e during installation of sealing member 46, which could prevent sealing member 46 from being fully inserted into sealing member groove 44d, central portion 44a includes one or more vent passages 44f which extend from sealing member groove 44d to an exterior surface of poppet 44. As illustrated herein, vent passages 44*f* may preferably extend in a direction parallel to axis 42 which may allow for simple formation thereof in a plastic injection molding operation which net-forms poppet 44.

Poppet 44 also includes a guiding portion 44*g* which extends away from first surface 44*b* and into fuel inlet 28, and in this way, guiding portion 44*g* is circumferentially surrounded by housing first portion end wall 38*d*. Guiding portion 44*g* includes a plurality of walls 44*h* which are arranged in a polar array about axis 42 such that a plurality of chambers 44*i* are defined between adjacent walls 44*h*. In other words, each chamber 44*i* is separated by a respective pair of walls 44*h* and each pair of adjacent walls 44*h* is separated by a respective chamber 44*i*. Walls 44*h* provide guidance, i.e. limit the extent to which poppet 44 can move laterally relative to axis 42, against an inner periphery of fuel inlet 28 when valve member assembly 34 moves between the open position and the closed position while chambers 44*i* provide a path for fuel to flow through fuel inlet 28 when valve member assembly 34 is in the open position. Walls 44*h* meet together at axis 42 and extend axially to an apex 44*j* which is on axis 42 and which is distal from central portion 44*a*. Each chamber 44*i* includes a chamber surface 44*k* which connects adjacent walls 44*h* and which is sloped relative to axis 42 such the perpendicular distance from axis 42 to chamber surface 44*k* increases when moving along axis 42 in a direction from apex 44*j* toward central portion 44*a*. Chamber surface 44*k* is preferably curved such that chamber surface 44*k* is concave. In this way, chamber surfaces 44*k* provide a smooth transition to direct fuel around poppet 44 when fuel flows through fuel inlet 28.

Poppet 44 also includes a spring guide portion 44*l* which extends away from second surface 44*c*. One end of valve spring 36 abuts second surface 44*c* such that spring guide portion 44*l* laterally, i.e. perpendicular to axis 42, positions one end of valve spring 36 in order to maintain the position of valve spring 36 on poppet 44. As illustrated herein, vent passages 44*f* may extend through spring guide portion 44*l*. It should be noted that the final coil of valve spring 36 which engages poppet 44 may engage poppet 44 at one discrete radial location, thereby placing a non-symmetric load on valve member assembly 34 which causes valve member assembly 34 to tip slightly relative to axis 42 when moved to the open position, thereby minimizing the possibility of valve member assembly 34 resonating which could lead to undesirable noise. In order to further enhance the ability of valve member assembly 34 to tip relative to axis 42 when moved to the open position, walls 44*h*, chamber surfaces 44*k*, and chambers 44*i* may be non-uniformly sized, spaced, shaped, or axially positioned.

Figure 3:
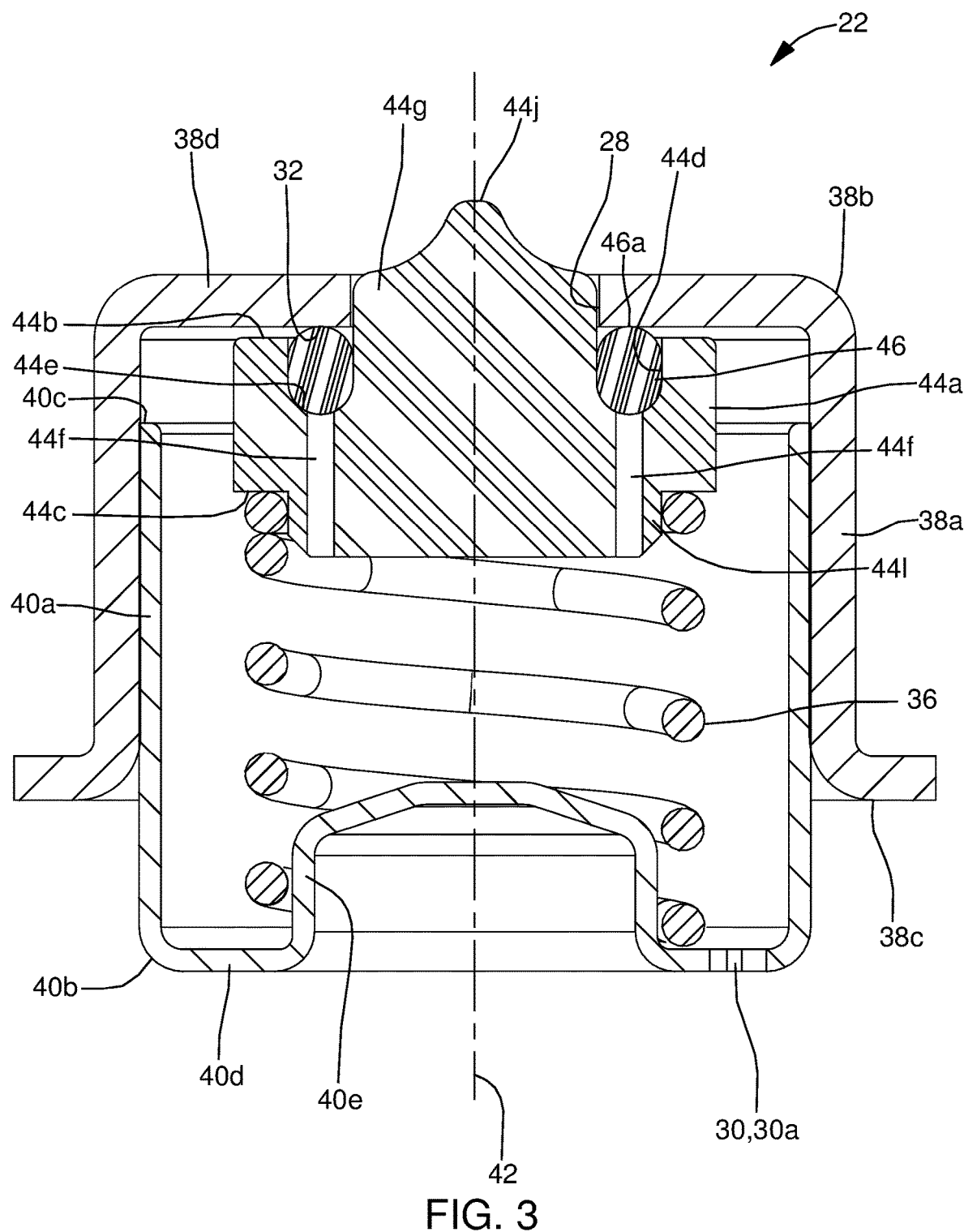
FIG. 3 is a cross-sectional view of the fuel pressure regulator in accordance with the present disclosure.
Figure 4:
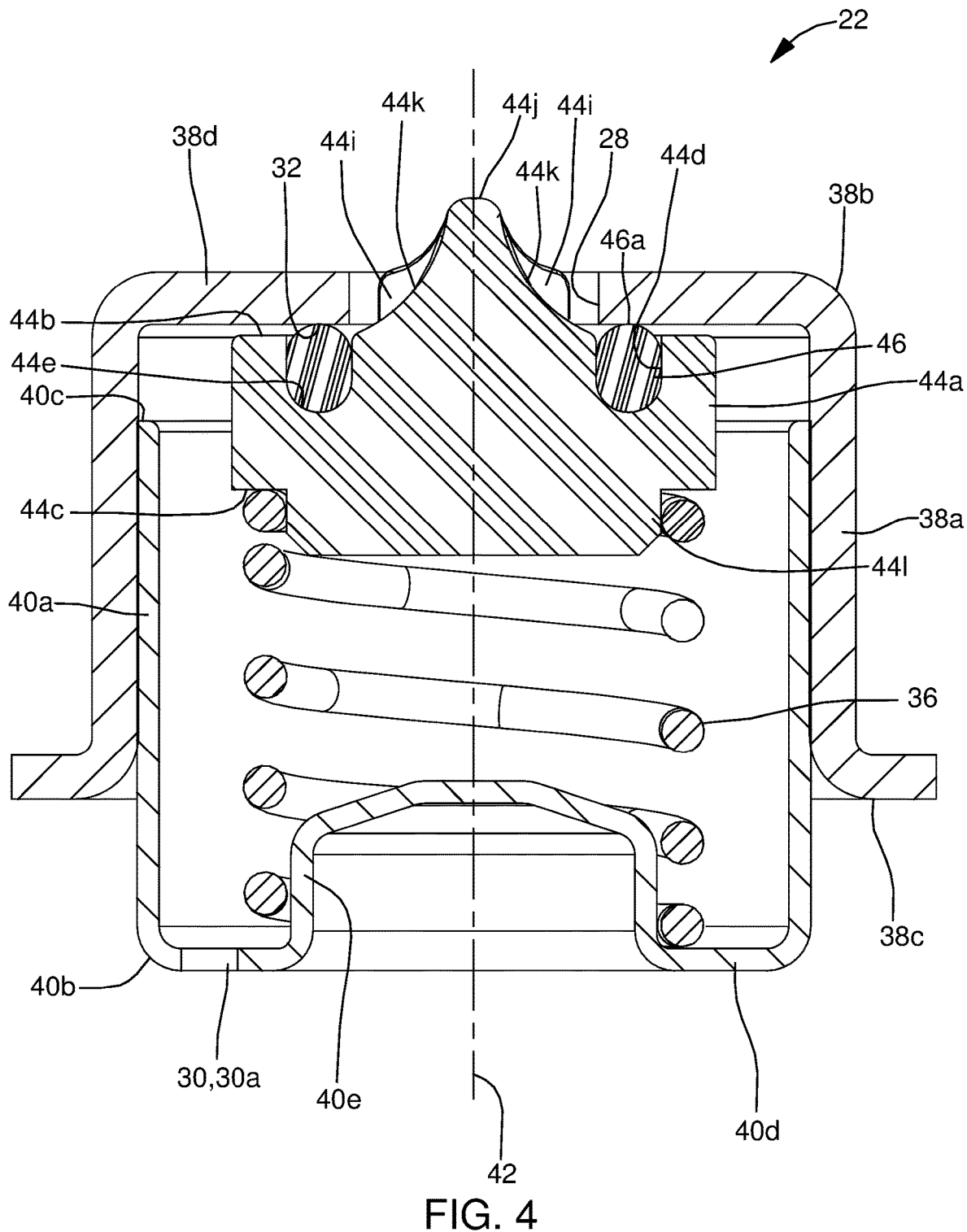
FIG. 4 is the cross-sectional view of the fuel pressure regulator of FIG. 3, sectioned in a plane that is rotated 45° compared to the section of FIG. 3 and shown in a closed position.
Figure 5:
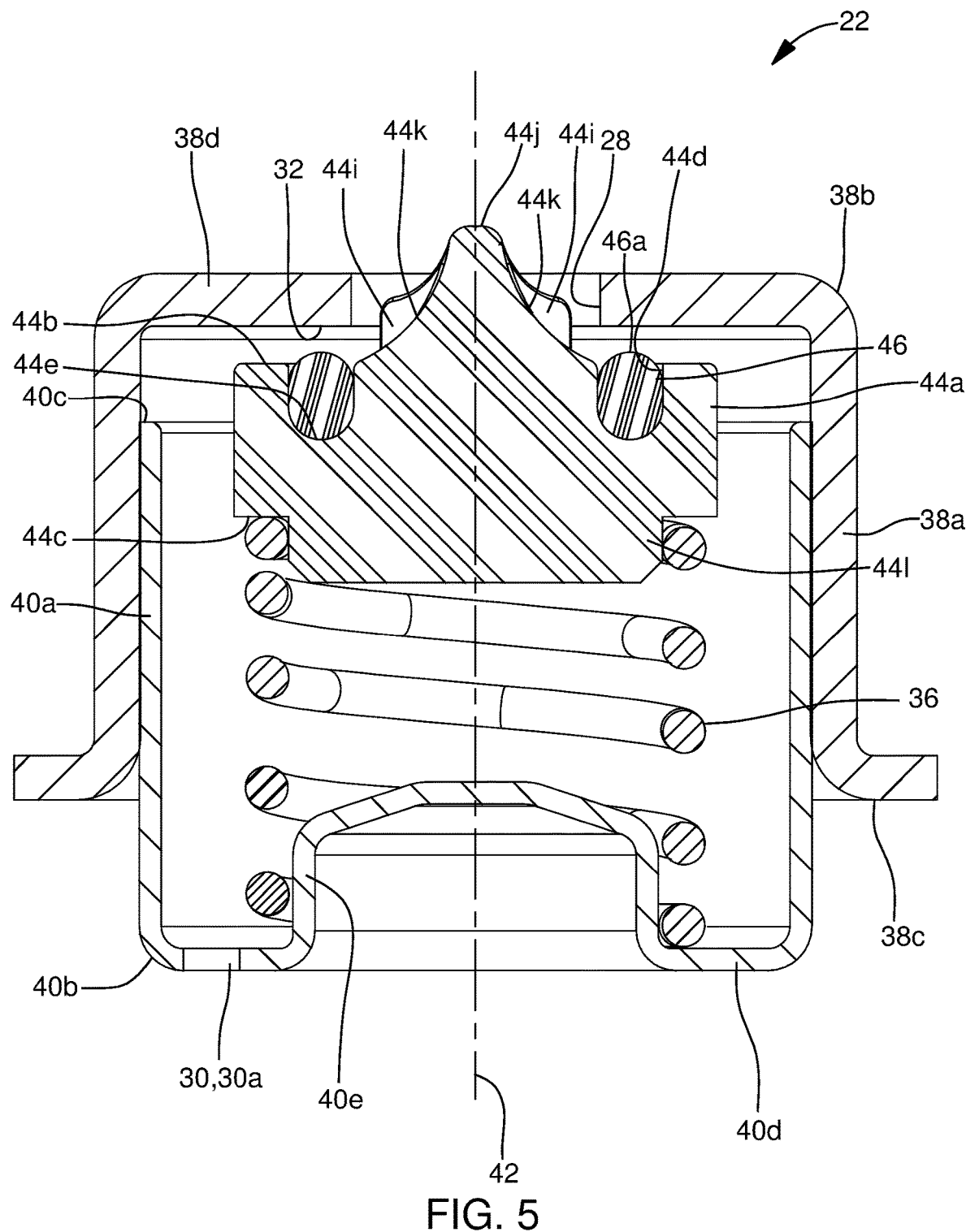
FIG. 5 is the cross-sectional view of FIG. 4, now shown in an open position.

Sealing member 46 is annular in shape and is made of an elastomer material which is resilient and compliant, and may be, by way of non-limiting example only, FKM or nitrile. Sealing member 46 may be a standard O-ring which has a circular cross-sectional shape, i.e. when sectioned parallel to axis 42, prior to being installed within sealing member groove 44*d*, but is elastically deformed as illustrated in FIGS. 3-5 when installed within sealing member groove 44*d* to have a generally oval cross-sectional shape because sealing member 46 is compressed between the inner periphery and the outer periphery of sealing member groove 44*d*, thereby elongating sealing member 46 in a direction parallel to axis 42. Sealing member 46 includes a sealing member surface 46*a* which faces toward, and which is axially aligned with, seating surface 32. When valve member assembly 34 is in the closed position, sealing member surface 46*a* engages seating surface 32, thereby preventing fuel flow from fuel inlet 28 to fuel outlet 30. Conversely, when valve member assembly 34 is in the open position as a result of fuel pressure upstream of fuel inlet 28 being sufficiently high to overcome the force of valve spring 36, sealing member surface 46*a* is spaced apart from seating surface 32, thereby allowing fuel flow from fuel inlet 28 to fuel outlet 30. When sealing member surface 46*a* is spaced apart from seating surface 32, sealing member surface 46*a* is convex facing toward seating surface 32 and seating surface 32 is planar. Conversely, when sealing member surface 46*a* engages seating surface 32, sealing member surface 46*a* is elastically deformed to conform to seating surface 32 which is planar. This ability for sealing member surface 46*a* to elastically deform ensures a positive seal when valve member assembly 34 is in the closed position and minimizes or eliminates the need for post-processing of seating surface 32.

Figure 6:
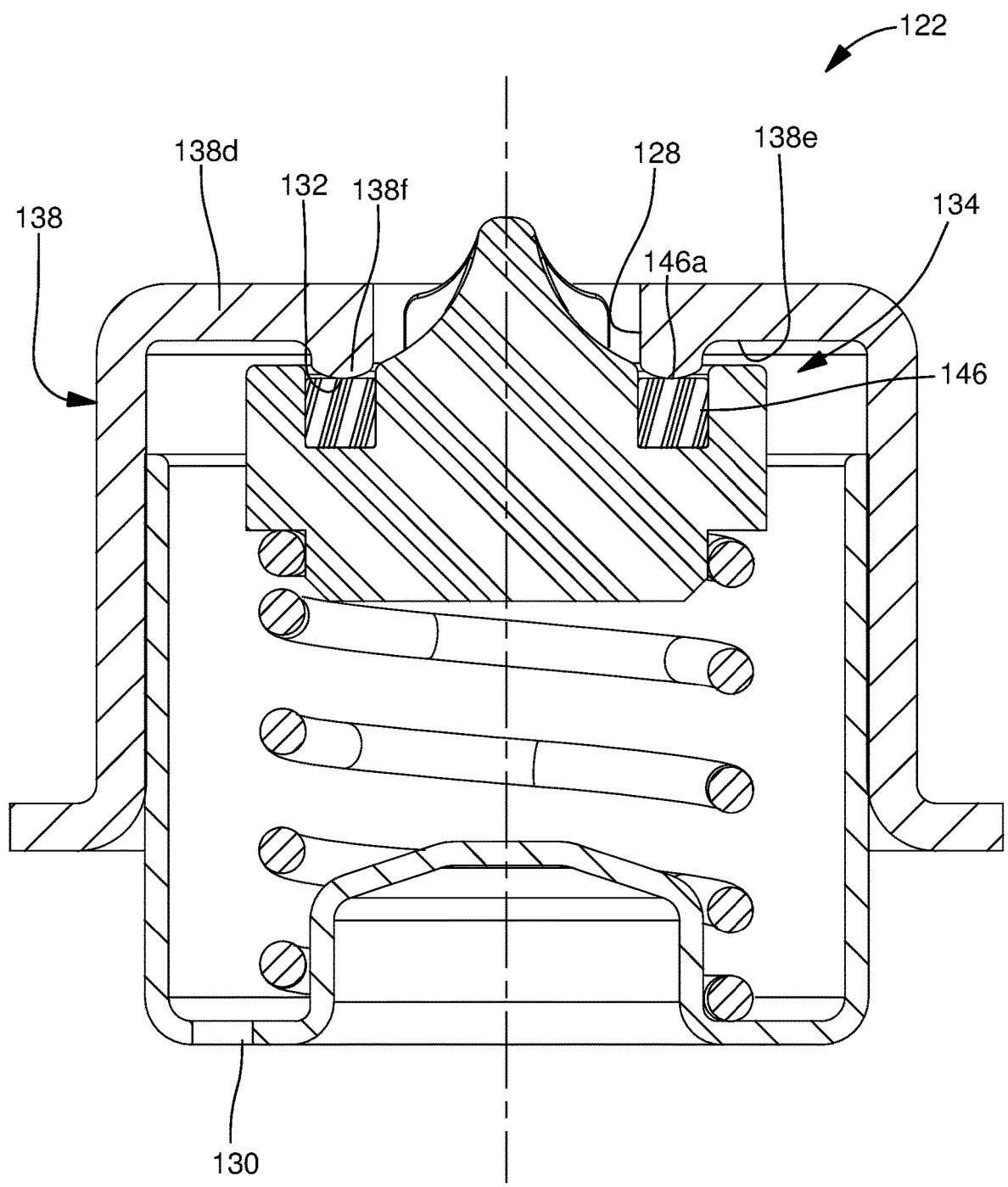
FIG. 6 is a cross-sectional view of another fuel pressure regulator in accordance with the present disclosure.

Reference will now be made to FIG. 6 which shows fuel pressure regulator 122 which is substantially the same as fuel pressure regulator 22 with the exception of the features that will now be described. Housing first portion 138 of fuel pressure regulator 122 is similar to housing first portion 38 of fuel pressure regulator 22 except for how seating surface 132 is provided on housing first portion end wall 138*d*. Housing first portion end wall 138*d* includes a housing first portion end wall planar surface 138*e* which is annular in shape and also includes a bead 138*f* which is annular in shape and separates fuel inlet 128 from housing first portion end wall planar surface 138*e*. Bead 138*f* protrudes from housing first portion end wall planar surface 138*e* such that bead 138*f* includes seating surface 132. As illustrated herein, bead 138*f* is convex facing toward sealing member surface 146*a* of sealing member 146.

Sealing member 146 of fuel pressure regulator 122 is similar to sealing member 46 of fuel pressure regulator 22 except that sealing member 146 is generally square or rectangular in cross-sectional shape when sectioned by a plane that is parallel to axis 42, allowing for the corners of sealing member 146 to be radiused. When valve member assembly 134 is in the closed position, sealing member surface 146*a* engages seating surface 132, thereby preventing fuel flow from fuel inlet 128 to fuel outlet 130. Conversely, when valve member assembly 134 is in the open position, sealing member surface 146*a* is spaced apart from seating surface 132, thereby allowing fluid flow from fuel inlet 128 to fuel outlet 130. When sealing member surface 146*a* is spaced apart from seating surface 32, sealing member surface 146*a* is planar and seating surface 132 is convex facing toward sealing member surface 146*a*. Conversely, when sealing member surface 146*a* engages seating surface 32, sealing member surface 146*a* is elastically deformed to conform to seating surface 32 which is convex. This ability for sealing member surface 146*a* to elastically deform ensures a positive seal when valve member assembly 34 is in the closed position and minimizes or eliminates the need for post-processing of seating surface 132.

Housing first portion 38, housing second portion 40, and housing first portion 138 may each be manufactured from metal, for example stainless steel or may alternatively be manufactured from plastic. When metal is selected, housing first portion 38, housing second portion 40, and housing first portion 138 may be manufactured from sheet metal which is formed to include the previously described features using punching, stamping, and deep drawing techniques. When plastic is selected, housing first portion 38, housing second portion 40, and housing first portion 138 may be manufactured using a plastic injection molding process which net-forms the previously described features.

Fuel pressure regulator 22 and fuel pressure regulator 122 as described herein allow for a positive seal in the closed position without the need for post processing, such as coining, burnishing, and/or lapping of seating surface 32 and seating surface 132 because sealing member 46 and sealing member 146 are able to conform to seating surface 32 and seating surface 132 respectively. By eliminating the need for post processing, manufacturing time and expenses can be minimized. Furthermore, the possibility of hysteresis is minimized since some axial misalignment between seating surface 32 and sealing member 46 and between seating surface 132 and sealing member 146 can be tolerated. Also furthermore, sealing member 46 and sealing member 146 are not susceptible to being stuck to seating surface 32 and seating surface 132 respectively which provides ensured opening of valve member assembly 34 and valve member assembly 134 when desired.

While this invention has been described in terms of preferred embodiments thereof, it is not intended to be so limited, but rather only to the extent set forth in the claims that follow.

I claim:
1. A fuel pressure regulator comprising:
 a fuel inlet;
 a fuel outlet;
 a seating surface; and
 a valve member assembly comprising a poppet and also comprising a sealing member which is made of an elastomer material as a discrete element from said poppet and which is annular in shape and including a sealing member surface such that said sealing member includes a central opening extending therethrough which is closed by said poppet, said sealing member being supported by said poppet, and said valve member assembly being moveable between 1) a closed position in which said sealing member surface engages said seating surface, thereby preventing fuel flow from said fuel inlet to said fuel outlet and 2) an open position in which said sealing member surface is spaced apart from said seating surface, thereby allowing fuel flow from said fuel inlet to said fuel outlet;
 wherein said fuel pressure regulator comprises a housing;
 wherein said fuel inlet selectively allows fuel into said housing;
 wherein said fuel outlet selectively allows fuel out of said housing;
 wherein said housing includes a housing first portion having a housing first portion circumferential wall which is tubular and which extends from a housing first portion first end to a housing first portion second end and also having a housing first portion end wall which traverses said housing first portion first end;
 wherein said fuel inlet extends through said housing first portion end wall; and
 wherein said seating surface is on said housing first portion end wall.

2. A fuel pressure regulator as in claim 1, wherein at least one of said seating surface and said sealing member surface is planar when said valve member assembly is in said open position.

3. A fuel pressure regulator as in claim 1, wherein:
 one of said seating surface and said sealing member surface is planar when said valve member assembly is in said open position; and
 the other of said seating surface and said sealing member surface is convex facing toward said one of said seating surface and said sealing member surface when said valve member assembly is in said open position.

4. A fuel pressure regulator as in claim 1, wherein:
 said housing first portion end wall includes a planar surface; and
 said housing first portion end wall includes a bead which is annular in shape and protrudes from said planar surface such that said bead includes said seating surface.

5. A fuel pressure regulator as in claim 4, wherein said bead is convex facing toward said sealing member surface.

6. A fuel pressure regulator as in claim 1, wherein said poppet includes:
 a central portion which extends along an axis from a first surface which is traverse to said axis to a second surface which is traverse to said axis; and
 a guiding portion which extends away from said first surface, through said central opening of said sealing member, and into said fuel inlet.

7. A fuel pressure regulator as in claim 6, wherein said central portion includes a sealing member groove which extends into said first surface such that said sealing member groove is annular in shape and such that a portion of said sealing member is received within said sealing member groove, said sealing member groove 1) being bounded radially inward by an inner wall surface of said poppet which extends from said first surface, 2) being bounded radially outward by an outer wall surface of said poppet which extends from said first surface, and 3) being bounded axially by a bottom surface of said poppet which joins said inner wall surface to said outer wall surface.

8. A fuel pressure regulator as in claim 7, wherein said central portion includes a vent passage which extends from said sealing member groove, such that said vent passage intersects with said bottom surface at a location between said inner wall surface and said outer wall surface, to an exterior surface of said poppet such that said vent passage prevents a buildup of air between said sealing member and said sealing member groove.

9. A fuel pressure regulator as in claim 6, wherein said guiding portion includes a plurality of walls arranged in a polar array about said axis such that a plurality of chambers are defined between said plurality of walls through which fuel flows when said valve member assembly is in said open position and such that the plurality of walls move together with the valve member assembly when moving between the closed position and the open position.

10. A fuel pressure regulator as in claim 9, wherein said plurality of walls provide guidance against an inner periphery of said fuel inlet when said valve member assembly moves between said open position and said closed position.

11. A fuel pressure regulator as in claim 9, wherein:
 said plurality of walls meet together at said axis and extend axially to an apex which is on said axis and which is distal from said central portion; and
 each of said plurality of chambers includes a chamber surface which connects adjacent ones of said plurality of walls and which is sloped such that a distance perpendicular to said axis to said chamber surface increases when moving along said axis in a direction from said apex toward said central portion.

12. A fuel pressure regulator as in claim 11, wherein said chamber surface is concave.

13. A fuel pressure regulator as in claim 6, wherein:
 said poppet also includes a spring guide portion which extends away from said second surface; and said fuel pressure regulator also includes a spring which is grounded to said housing and abuts said second surface such that said spring is laterally positioned by said spring guide portion, thereby biasing said valve member assembly toward said closed position.

14. A fuel pressure regulator as in claim 13, wherein:

said housing includes a housing second portion having a housing second portion circumferential wall which is tubular and extends from a housing second portion first end to a housing second portion second end and also having a housing second portion end wall which traverses said housing second portion first end;

said spring is grounded to said housing second portion end wall.

15. A fuel pressure regulator comprising:

a fuel inlet;

a fuel outlet;

a seating surface; and a valve member assembly comprising a poppet and also comprising a sealing member which is made of an elastomer material as a discrete element from said poppet and which is annular in shape and including a sealing member surface such that said sealing member includes a central opening extending therethrough which is closed by said poppet, said sealing member being supported by said poppet, and said valve member assembly being moveable between 1) a closed position in which said sealing member surface engages said seating surface, thereby preventing fuel flow from said fuel inlet to said fuel outlet and 2) an open position in which said sealing member surface is spaced apart from said seating surface, thereby allowing fuel flow from said fuel inlet to said fuel outlet;

wherein said poppet includes:

a central portion which extends along an axis from a first surface which is traverse to said axis to a second surface which is traverse to said axis; and a guiding portion which extends away from said first surface, through said central opening of said sealing member, and into said fuel inlet;

wherein said central portion includes a sealing member groove which extends into said first surface such that said sealing member groove is annular in shape and such that a portion of said sealing member is received within said sealing member groove, said sealing member groove 1) being bounded radially inward by an inner wall surface of said poppet which extends from said first surface, 2) being bounded radially outward by an outer wall surface of said poppet which extends from said first surface, and 3) being bounded axially by a bottom surface of said poppet which joins said inner wall surface to said outer wall surface.

16. A fuel pressure regulator as in claim 15, wherein said guiding portion includes a plurality of walls arranged in a polar array about said axis such that a plurality of chambers are defined between said plurality of walls through which fuel flows when said valve member assembly is in said open position and such that the plurality of walls move together with the valve member assembly when moving between the closed position and the open position.

17. A fuel pressure regulator as in claim 16, wherein said plurality of walls provide guidance against an inner periphery of said fuel inlet when said valve member assembly moves between said open position and said closed position.

18. A fuel pressure regulator as in claim 16, wherein:

said plurality of walls meet together at said axis and extend axially to an apex which is on said axis and which is distal from said central portion; and each of said plurality of chambers includes a chamber surface which connects adjacent ones of said plurality of walls and which is sloped such that a distance perpendicular to said axis to said chamber surface increases when moving along said axis in a direction from said apex toward said central portion.

* * * * *